United States Patent [19]

Klerk et al.

[11] Patent Number: 5,637,645
[45] Date of Patent: Jun. 10, 1997

[54] CAOUTCHOUC MIXTURE FOR THE MANUFACTURE OF RUBBER PRODUCTS WITH LOW-TEMPERATURE APPLICATION CAPABILITY, RESISTANCE TO OIL, LOW CRYSTALLIZATION TENDENCY AND HIGH DYNAMIC STRESSABILITY

[75] Inventors: Manfred Klerk, Hamburg; Gerhard Merkmann, Gotha; Karl-Heinz Krause, Chemnitz, all of Germany

[73] Assignee: Phoenix Aktiengesellschaft, Hamburg, Germany

[21] Appl. No.: 240,693

[22] PCT Filed: Nov. 3, 1992

[86] PCT No.: PCT/DE92/00914

§ 371 Date: May 23, 1994

§ 102(e) Date: May 23, 1994

[87] PCT Pub. No.: WO93/09177

PCT Pub. Date: May 13, 1993

[30] Foreign Application Priority Data

Apr. 28, 1992 [DE] Germany .................. 42 13 937.6
Nov. 3, 1992 [DE] Germany .................. 41 36 351.5

[51] Int. Cl.⁶ .................. C08L 7/00; C08L 7/02; C08L 9/06; C08L 23/08

[52] U.S. Cl. .................. 525/236; 525/227; 525/208; 525/241; 525/240; 525/237

[58] Field of Search .................. 525/236, 237, 525/240, 241, 208, 227

[56] References Cited

U.S. PATENT DOCUMENTS

| | | | |
|---|---|---|---|
| 5,118,546 | 6/1992 | Burlett et al. | 428/36.8 |
| 5,281,651 | 1/1994 | Arjunan et al. | 524/519 |

*Primary Examiner*—W. Robinson H. Clark
*Attorney, Agent, or Firm*—Collard & Roe, P.C.

[57] ABSTRACT

The invention relates to a caoutchouc mixture for the manufacture of rubber products with low-temperature application capability, resistance to oil, low crystallization tendency, and high dynamic stressability, on the basis of natural caoutchouc, in particular viscosity-stabilized natural caoutchouc, and the usual mixture ingredients. The essence of said invention lies in that the caoutchouc mixture additionally contains 5 to 30% by weight 1,4-polybutadiene with a high cis-proportion, and 5 to 30% by weight epoxidized natural caoutchouc. An additional mixture variation is introduced.

8 Claims, No Drawings

CAOUTCHOUC MIXTURE FOR THE MANUFACTURE OF RUBBER PRODUCTS WITH LOW-TEMPERATURE APPLICATION CAPABILITY, RESISTANCE TO OIL, LOW CRYSTALLIZATION TENDENCY AND HIGH DYNAMIC STRESSABILITY

BACKGROUND OF THE INVENTION

1. Field of the Invention

The invention relates to a caoutchouc mixture for the manufacture of rubber products (vulcanizates) with low-temperature application capability even under extreme climatic conditions, resistance to oil, low crystallization tendency and high dynamic stressability, on the basis of natural caoutchouc and the usual mixing ingredients such as fillers, plasticizers, anti-aging agents, cross-linking agents, zinc oxide, as well as additional additives, if necessary.

2. The Prior Art

When passenger cars for long-distance travel are shipped to the former Soviet Union, operators there request that each second passenger car is equipped with a 32-kw power generator set (power for air-conditioning in cold weather). Each of said power generator sets comprises an axle center transmission (with two rubber couplings; so-called rubber centering cone couplings), a universal-joint shaft, a highly elastic rubber preshift coupling, and a generator. The rubber preshift coupling connects the universal-joint shaft with the generator. The long-distance passenger cars with the above power generator set and, therefore, also the rubber couplings have to be capable of functioning even at outside temperatures of −60°. The rubber materials of the coupling should crystallize as little as possible. In addition to such strong influence of cold, an influence of oil occurs in connection with the rubber preshift couplings when the car is cleaned, which, however, must not be viewed as permanent. Heretofore, no suitable rubber materials have been available to meet at the same time said requirements with respect to low-temperature application capability, resistance to oil, low crystallization tendency and high dynamic stressability.

In the preparation of a caoutchouc mixture from various types of elastomer, its compatibility in the polymer blend has to be taken into account. If vulcanizate properties are required which no elastomer alone can satisfy, it is important that a thermodynamically compatible elastomer blend is available that optimally possesses all of the required properties. The use of such a caoutchouc mixture then represents a compromise solution. In addition, such a polymer blend has to be capable of cross-linking.

Cross-linked caoutchouc mixtures on the basis of natural caoutchouc are known, whereby reference is made, for example, to the following literature sources: U.S. Pat. No. 3,342,660; BE-A-698 519; GB-A-2 004 286; Chemical Patents Index, Documentation Abstracts Journal (Section Ch, Week 9128, Sep. 11, 1991, Derwent Publications Ltd., London, GB, page 412, AN 91-203 142). However, the caoutchouc mixtures known heretofore do not satisfy the overall requirements. For example, a caoutchouc mixture is introduced in the last-mentioned document Chemical Patents Index, which contains epoxidized natural caoutchouc and is suitable for application in the low-temperature range, without, however, satisfying all requirements.

SUMMARY OF THE INVENTION

Now, with the caoutchouc mixture according to the invention, which is based on natural caoutchouc, in particular viscosity-stabilized natural caoutchounc in combination with the additional polymer materials according to the first embodiment (mixture variation I) or the second embodiment (mixture variation II), a polymer blend is available that satisfies the aforementioned requirements or conditions. The additional polymer materials can contain from 5 to 30% by weight 1,4-polybutadiene with a high cis-proportion, and from 5 to 30% by weight epoxidized natural caoutchouc (mixture variation I). Also, the additional polymer materials can contain from 5 to 20% by weight styrene-butadiene-caoutchouc and from 5 to 30% by weight ethylene-acrylate-caoutchouc (mixture variation II).

DETAILED DESCRIPTION OF PREFERRED EMBODIMENTS

Usefully, the following parameters are applied with respect to said two mixture variations:

| Mixture variation I | |
|---|---|
| 1,4-polybutadiene | |
| Quantity: | 10 to 15% by weight |
| cis-proportion: | >90% |
| Epoxidized natural caoutchouc | |
| Quantity: | 10 to 15% by weight |
| Degree of epoxidation: | about 50% |
| Mixture variation II | |
| Styrene-butadiene-caoutchouc Quantity: | 5 to 10% by weight |
| Ethylene-acrylate-caoutchouc Quantity: | 10 to 15% by weight |

The caoutchouc mixtures according to the invention are particularly used for the manufacture of shaped articles made of rubber, or of composite articles made of rubber and metal and/or plastic, in particular of couplings for rail vehicle application.

In the caoutchouc mixtures, all percents by weight are based upon the total composition weight.

The following experimental part contains formulas (Table 1) and test results (Table 2), where A represents conventional and B (mixture variation I) and C (mixture variation II) represent formulas according to the invention.

TABLE 1

| Mixture components (% by wt) | A | B | C |
|---|---|---|---|
| NR CV[a] | 44.5 | 38.0 | 44.5 |
| SBR[b] | 6.0 | — | 5.5 |
| BR[c] | 13.0 | 11.0 | — |
| ENR[d] | — | 14.5 | — |
| ACM[e] | — | — | 13.5 |
| Carbon black N 550[f] | 11.0 | 11.0 | 11.0 |
| Carbon black N 330[f] | 7.0 | 7.0 | 7.0 |
| Anti-aging agent | 2.0 | 2.0 | 2.0 |
| Special paraffin[g] | 2.0 | 2.0 | 2.0 |
| Paraffinic plasticizer | 8.0 | 8.0 | 8.0 |

TABLE 1-continued

| Mixture components (% by wt) | A | B | C |
|---|---|---|---|
| Accelerator | 0.6 | 0.6 | 0.6 |
| Sulphur | 1.3 | 1.3 | 1.3 |
| Inhibitor | 0.3 | 0.3 | 0.3 |
| Zinc oxide | 3.0 | 3.0 | 3.0 |
| Stearic acid | 1.3 | 1.3 | 1.3 |
| | 100.00 | 100.00 | 100.00 | a)Viscosity-stabilizing natural caoutchouc (Money-viscosity: about 60)
b)Styrene-butadiene-caoutchouc
c)1,4-polybutadiene with cis-proportion above 90%
d)50% expoxidized natural caoutchouc (Weber & Schaer, Hamburg)
e)Ethylene-acrylate-caoutchouc (Du Pont)
f)Degussa
g)Hydrierwerke Zeitz

TABLE 2

| Test results | A | B | C |
|---|---|---|---|
| Brittle temp. °C. | −60 | −70 | −67 |
| Lose factor tan δ at −40° C. | 0.078 | 0.067 | 0.062 |
| Swelling tests (Soviet transmission oil TSZ9) | | | |
| Storage temperature | Room temperature | | |
| Volume swelling after 24 h | 22.60% | 6.68% | 3.59% |
| Volume swelling after 48 h | 40.12% | 10.51% | 5.83% |
| Weight swelling after 24 h | 20.88% | 7.14% | 4.16% |
| Weight swelling after 48 h | 37.21% | 10.72% | 6.27% |
| Crystallization behavior (measured on coupling GM 056) | | | |
| Torsion angle $\phi_o$ (so-called zero time after 1 day freezing at −25° C.) | 9.3° | 3.3° | 7.4° |
| Torsion angle $\phi_{14}$ (after 14 days freezing at −25° C.) | 7.5° | 2.3° | 5.0° |
| $Gr_{14}$ (stiffness factor; measured as modulus of elasticity in shear for evaluating the crystallization behavior | 1.24 | 1.44 | 1.48 |

$$Gr_{14} = \frac{\phi_o}{\phi_{14}}$$

$Gr_{14}=1.0$ is ideal, i.e., no stiffening at all after 14 days of storage of the coupling at −25° C. However, this is nonexisting in practical life because all materials (rubber) crystallize more or less during cold storage. Based on experience, values of up to about 3.0 have to be viewed as a low crystallization behavior. Tests on known couplings, which were classified as "extremely resistant to cold", showed a $Gr_{14}$-value of about 8, i.e., the coupling is no longer capable of functioning.

We claim:

1. Rubber mixture for the manufacture of molded articles made of rubber, or of composite articles made of rubber and a substance selected from the group consisting of metal and plastic, comprising natural caoutchouc, as well as mixing ingredients selected from the group consisting of fillers, plasticizers, anti-aging agents, cross-linking agents, and zinc oxide, wherein the rubber mixture additionally contains 10 to 15% by weight 1,4-polybutadiene with a high cis-proportion of more than 90%, 5 to 30% by weight epoxidized natural caoutchouc and wherein all percents by weight are based upon the total composition weight.

2. Rubber mixture according to claim 1, wherein the epoxidized natural caoutchouc, has had about 50% of its double bonds epoxidized.

3. Caoutchouc mixture for the manufacture of rubber products comprising natural caoutchouc, as well as mixing ingredients selected from the group consisting of fillers, plasticizers, anti-aging agents, cross-linking agents, and zinc oxide, wherein the caoutchouc mixture additionally contains 10 to 15% by weight 1,4-polybutadiene with a high cis-proportion of more than 90%, 10 to 15% by weight epoxidized natural caoutchouc, and wherein all percents by weight are based upon the total composition weight.

4. Rubber mixture for the manufacture of molded articles made of rubber, or of composite articles made of rubber and a substance selected from the group consisting of metal and plastic, comprising natural caoutchouc, as well as mixing ingredients selected from the group consisting of fillers, plasticizers, anti-aging agents, cross-linking agents, and zinc oxide, wherein the rubber mixture additionally contains 5 to 20% by weight styrene-butadiene-caoutchouc, 5 to 30% by weight ethylene-acrylate-caoutchouc and wherein all percents by weight are based upon the total composition weight.

5. Rubber mixture according to claim 4, containing 5 to 10% by weight styrene-butadiene-caoutchouc.

6. Rubber mixture according to claim 4, containing 10 to 15% by weight ethylene-acrylate-caoutchouc.

7. Caoutchouc mixture for the manufacture of rubber products comprising natural caoutchouc, as well as mixing ingredients selected from the group consisting of fillers, plasticizers, anti-aging agents, cross-linking agents, and zinc oxide, and wherein the caoutchouc mixture additionally contains 5 to 10% by weight styrene-butadiene-caoutchouc, 10 to 15% by weight ethylene-acrylate-caoutchouc, and wherein all percents by weight are based upon the total composition weight.

8. Caoutchouc mixture according to claim 3, wherein the epoxidized natural caoutchouc has had about 50% of its double bonds epoxidized.

* * * * *

UNITED STATES PATENT AND TRADEMARK OFFICE
CERTIFICATE OF CORRECTION

PATENT NO. : 5,637,645
DATED : June 10, 1997
INVENTOR(S) : KLERK ET AL

It is certified that error appears in the above-indentified patent and that said Letters Patent is hereby corrected as shown below:

On the Title page, column 1, line [30], change "Nov. 3, 1992" to --Nov. 5, 1991--.

Signed and Sealed this

Seventh Day of October, 1997

*Attest:*

BRUCE LEHMAN

*Attesting Officer*   Commissioner of Patents and Trademarks